United States Patent
Meilich et al.

(10) Patent No.: US 10,946,283 B1
(45) Date of Patent: Mar. 16, 2021

(54) COMPUTER SYSTEM AND METHOD FOR MORE EFFICIENTLY STORING, ISSUING, AND TRANSACTING TOKENIZED BLOCKCHAIN GAME ASSETS MANAGED BY A SMART CONTRACT

(71) Applicant: Big Time Studios Ltd., George Town (KY)

(72) Inventors: Ariel Meilich, Montevideo (UY); Thor Alexander, Beverly Hills, CA (US); Hugo Arregui, Gonzalez Catan (AR)

(73) Assignee: Big Time Studios Ltd., Grand Cayman (KY)

(*) Notice: Subject to any disclaimer, the term of this patent is extended or adjusted under 35 U.S.C. 154(b) by 0 days.

(21) Appl. No.: 16/950,390

(22) Filed: Nov. 17, 2020

Related U.S. Application Data (60) Provisional application No. 63/052,601, filed on Jul. 16, 2020.

(51) Int. Cl.

| | | |
|---|---|---|
| *A63F 13/63* | (2014.01) | |
| *A63F 13/792* | (2014.01) | |
| *G06Q 20/36* | (2012.01) | |
| *G06Q 20/12* | (2012.01) | |
| *A63F 13/73* | (2014.01) | |

(52) U.S. Cl.
CPC .............. *A63F 13/63* (2014.09); *A63F 13/73* (2014.09); *A63F 13/792* (2014.09); *G06Q 20/1235* (2013.01); *G06Q 20/363* (2013.01); *G06Q 20/3674* (2013.01)

(58) Field of Classification Search
CPC ........ A63F 13/63; A63F 13/73; A63F 13/792; G06Q 20/1235; G06Q 20/363; G06Q 20/3674
See application file for complete search history.

(56) References Cited

U.S. PATENT DOCUMENTS

| | | | |
|---|---|---|---|
| 9,352,217 B1* | 5/2016 | Curtis | A63F 13/792 |
| 9,776,089 B1* | 10/2017 | Curtis | A63F 13/792 |
| 10,518,178 B1* | 12/2019 | Cunningham | A63F 13/352 |
| 10,632,386 B1* | 4/2020 | Curtis | A63F 13/822 |
| 10,726,107 B2* | 7/2020 | Cunningham | H04L 9/0637 |
| 10,786,741 B2* | 9/2020 | Cunningham | A63F 13/70 |
| 10,850,202 B1* | 12/2020 | Koch | G06Q 20/1235 |
| 10,861,095 B1* | 12/2020 | Koch | G06Q 40/04 |
| 10,872,367 B1* | 12/2020 | Stoddard | G06Q 30/0641 |
| 2013/0254125 A1* | 9/2013 | Sanders | H04L 63/102 705/310 |
| 2014/0335948 A1* | 11/2014 | Jung | G06Q 30/06 463/31 |
| 2016/0335609 A1* | 11/2016 | Jenkins | G06Q 20/1235 |
| 2017/0052676 A1* | 2/2017 | Pulier | G06F 3/04883 |
| 2018/0114403 A1* | 4/2018 | Jayachandran | H04L 9/3236 |

(Continued)

*Primary Examiner* — William H McCulloch, Jr.
(74) *Attorney, Agent, or Firm* — Sheppard Mullin Richter & Hampton LLP (57) ABSTRACT

A computer system and method is disclosed including a vault application to facilitate the transacting of game assets represented by tokens managed by a smart contract via a hybrid approach that permits certain transactions of game assets to be conducted using an in-game centralized database approach (which does not necessarily include a decentralized network) and other transactions to be managed on a decentralized network, via a blockchain or other distributed ledger technology (DLT) network.

14 Claims, 5 Drawing Sheets

(56) References Cited

U.S. PATENT DOCUMENTS

| | | | | |
|---|---|---|---|---|
| 2018/0216946 A1* | 8/2018 | Gueye | ............... | H04W 4/029 |
| 2018/0247191 A1* | 8/2018 | Katz | ............... | G06Q 20/0655 |
| 2018/0307859 A1* | 10/2018 | LaFever | ............... | G16H 10/60 |
| 2019/0057379 A1* | 2/2019 | Chalakudi | ............... | G06Q 20/38215 |
| 2019/0080407 A1* | 3/2019 | Molinari | ............... | G06Q 20/223 |
| 2019/0096191 A1* | 3/2019 | Stuehling | ............... | G07F 17/322 |
| 2019/0118094 A1* | 4/2019 | McCoy | ............... | H04L 9/3239 |
| 2019/0205873 A1* | 7/2019 | Kamalsky | ............... | H04L 63/12 |
| 2019/0229914 A1* | 7/2019 | Patel | ............... | H04L 9/30 |
| 2019/0295371 A1* | 9/2019 | Simons | ............... | H04L 9/3226 |
| 2019/0303892 A1* | 10/2019 | Yantis | ............... | G06Q 20/123 |
| 2020/0005284 A1* | 1/2020 | Vijayan | ............... | G06Q 20/065 |
| 2020/0042989 A1* | 2/2020 | Ramadoss | ............... | G06Q 20/102 |
| 2020/0044827 A1* | 2/2020 | Snow | ............... | G06Q 20/3829 |
| 2020/0394626 A1* | 12/2020 | Kikinis | ............... | G06Q 20/223 |

* cited by examiner

US 10,946,283 B1

COMPUTER SYSTEM AND METHOD FOR MORE EFFICIENTLY STORING, ISSUING, AND TRANSACTING TOKENIZED BLOCKCHAIN GAME ASSETS MANAGED BY A SMART CONTRACT

CROSS-REFERENCE TO RELATED APPLICATIONS

This application claims the benefit under 35 U.S.C. § 119(c) of U.S. Provisional Application No. 63/052,601, filed Jul. 16, 2020, which is hereby incorporated by reference in its entirety.

FIELD OF THE INVENTION

This invention pertains to a computer system and method including a vault application to facilitate the transacting of game assets represented by tokens managed by a smart contract via a hybrid approach that permits certain transactions of game assets to be conducted using an in-game centralized database approach (which does not necessarily include a decentralized network, per-transaction fee to the user) and other transactions to be managed on a decentralized network, via a blockchain or other distributed ledger technology (DLT) network, which may subject the user to a decentralized network, per-transaction fee.

BACKGROUND

Many video games offer various game assets for use in connection with gameplay, aesthetics, and other purposes. In many games, game assets are represented by rows in a centralized database managed and controlled by the game operator. They are licensed to the user and cannot be taken out of the game, be it to transfer them to someone else, to trade them in an external marketplace, or for safe storage purposes. The "sale" of in-game assets by game companies to players reportedly represents over 70% of the gaming industry revenue. Yet, the vast majority of these game assets exist as sunken, non-transferable value from the player perspective. If a player account is terminated, the license to use the game assets is terminated and the associated value is lost.

In recognition of these and other problems with existing approaches to in-game assets, a number of game companies have focused on blockchain-based games (simply referred to as blockchain games). Blockchain games use distributed ledger technology (e.g., a blockchain or other DLT) to mint and manage game assets (and/or for other purposes). These game assets may be truly owned by players and not just licensed as with traditional game assets. Ownership and transfer of blockchain game assets typically is managed via a decentralized network (e.g., not necessarily under control of the game company).

Blockchain game assets (and other digital assets) may be represented as cryptographic tokens. Often, these tokens are non-fungible tokens (NFTs). An example format for an NFT is a token standard referred to as ERC-721. ERC-1155 tokens may also be used. Tokens are typically stored in association with a user-controlled crypto wallet (referred to below as "wallet" for short). Wallets may have a public and a private key. The public key is a wallet's unique ID or address that the user can disclose for purposes of engaging in a transaction to enable the token to be sent to the wallet. The private key is used by the wallet to sign each transaction that the player sends to the network to validate that it was sent by the player from their wallet.

In the case of games using the Ethereum blockchain, the wallets may be ERC-721 compatible wallets, such as MetaMask, Fortmatic, and others. The requirement for players to acquire and maintain a wallet, and manage their private keys to acquire and manage tokens, leads to other problems. For example, a player must keep their private key secure to avoid risk of loss of items associated with the wallet. Loss or exposure of the private key can result in the player losing access to and/or ownership of the items in their wallet. The need to obtain a wallet has led to various difficulties in onboarding of new players. This has resulted in user experiences that are very different from those in traditional games.

Additionally, there can be costs associated with transferring tokens. All transactions that occur on Ethereum's main chain have a cost that is paid in Ether. Ether is a cryptocurrency native to the Ethereum blockchain. This fee is referred to as the 'gas' fee, and it is paid to the network user that 'mines' (or validates) the transaction. Transactions that offer higher prices get mined faster, since miners give these priority. Market prices for these transactions oscillate regularly, they tend to be more expensive when there is a higher usage of the network. The need to pay a gas fee for each transaction and the variability of the fee is undesirable.

Additionally, for game companies that already have a traditional (non-blockchain) game management system for managing traditional game assets and player's inventories, the switch to a blockchain-based management approach can be costly and disruptive. Typically, a given game uses one approach or the other for technical and other reasons.

For at least these reasons, while blockchain games overcome some of the problems with traditional games, they create other issues. These and other problems and drawbacks exist with known approaches to game assets.

SUMMARY OF THE INVENTION

By way of example only, the invention will be described in connection with tokenized game assets where an ERC-721 token represents ownership of a game asset and the game assets are managed via an in-game asset management system. The invention is not limited to the specific examples. While the invention is described in connection with games, it may be applied to other digital assets and applications other than games. In other applications, players may be more generally referred to as users. As used herein, blockchain games refers to games that use blockchain or other DLT to mint and/or manage at least some of the game assets and/or game economy, whether gameplay is implemented on a blockchain or not. For convenience, some examples refer to the use of the Ethereum blockchain and various Ethereum specific protocols (e.g., ERC-721 tokens). The use of blockchain generally, and the Ethereum blockchain and ERC-721 tokens in particular, are not intended to be limiting. The features of the invention can be implemented via other DLTs and/or using other protocols.

One aspect of the disclosure relates to a computer-implemented system that comprises a computer implemented vault application running on one or more hardware processors, including a vault that includes a facilitator and one or more vault smart contracts. When a game is configured to work with the vault, players can deposit tokens to the vault to add the corresponding game assets to their in-game inventory. The vault stores crypto tokens (e.g., NFTs) representing different digital assets (e.g., game assets) on behalf of a player and communicates with an in-game management system to reflect ownership of the game assets in the player's in-game inventory. The application provides a convenient interface to enable a user to move tokens to/from their vault and to/from their wallet(s) via the application interface.

The tokens to be deposited may be ones that the player has previously acquired and are existing in their wallet, if they have a wallet. Alternatively, the player may acquire new tokenized game assets via the vault interface, even if the player does not have a crypto wallet (as detailed below). Once the game asset is in their game inventory, the player can use the game asset within the game under control of the in-game management system, without the need to transact the underlying token. When a player wants to withdraw the game asset from the game, the player can select the game asset from the vault interface and designate a wallet to which the token should be transferred, and the vault communicates with the in-game management system to remove the game asset from the player's inventory and cause the corresponding token to be transferred, via the vault smart contract, to the designated wallet address. This also benefits game operators that want to leverage blockchain game assets without having to managing their own blockchain deployment.

The player may create a vault account and interact with their vault via a computer implemented software application that includes a graphical user interface. The graphical user interface(s) may include at least one UI that represents digital assets available from one or digital asset marketplaces that are accessible to the vault interface. One or more of the interface(s) may include at least one UI that enables a player to create and/or transact with a player vault account. One or more of the interface(s) may include at least one UI that enables a player to create and/or transact with a wallet. If the player has one or more crypto wallets, the player may associate the wallet(s) with the vault account. This enables a player to more easily move tokens from a wallet to their vault and from their vault to a wallet via the vault interface. If the player does not have a crypto wallet, the player may still use the vault to acquire tokenized game assets as discussed below. From the interface the player may select one or multiple digital assets to acquire and the vault interface can facilitate the acquisition for the player and deposit the token corresponding to the digital asset into the player's vault. Once a digital asset is in the player's vault they can move it into a game, transfer it to their wallet (if they have one) or another wallet via the vault interface. Additionally, via the vault interface, the player can transfer digital assets from the player's wallet to a game, their vault or other wallet. Once a player has created a vault account and associated a wallet, the vault application interface makes it much easier for the player to acquire digital assets and move the digital assets between their vault and wallet and into and out of a game.

As one example, the invention provides a technical solution to make the deposit, purchase and withdrawal of tokenized assets representing game assets more efficient and cost-effective, with a simplified user experience. According to this approach, when a player desires to purchase a tokenized game asset, vault smart contracts whitelisted by the system and created in advance are used (as explained below) to facilitate the user acquiring rights to the game asset and having it recorded to the player's account in the in-game database management system, but the tokens themselves are not transferred to a user designated wallet on the Ethereum (or other) blockchain until when the user decides to withdraw the game asset from the game. This approach enables the user to acquire the right to use a tokenized game asset in the game without the overhead associated with completing a blockchain transaction, unless and until the player wants to transfer the token to a designated wallet.

Among other things, this approach enables a user to acquire a tokenized game asset without necessarily having a crypto wallet, managing private keys or otherwise safeguarding their assets. Additionally, even if the player has a crypto wallet, the deferral of the token issuance reduces or defers the decentralized network fees until the token is issued to the player's wallet.

The invention may also provide players with a more efficient solution to exchange tokenized game assets with other players (e.g., within the game). Additionally, players can transfer their game assets from the centralized environment (e.g., an online video game platform) into their own crypto wallets (if they have one) or other designated wallet, or deposit the assets from their wallet into the centralized environment.

One aspect of the invention relates to a computer-implemented system, method, and program to curate, issue, store, and transact NFTs (e.g., ERC-712 tokens) that represent game assets, in such a way that these game assets can be held and transacted within the centralized game environment prior to the token being transferred to the user. When a user desires to purchase a tokenized game asset, assets are deposited in, and held by, a smart contract deployed by the system and the system communicates with a centralized database management system (e.g., a game inventory management system) which is used to manage a players in-game inventory of game assets. Transacting the assets in a centralized environment may allow for a cost reduction down to 0, and little or no transaction wait time.

Each of the vault smart contracts are created in advance, while the issuance of each individual token only occurs when a user intends to withdraw the token from the game, allowing for a massive cost reduction and/or deferral in the issuance of the tokens.

The game assets may have an ItemID designated by the in-game management system. According to one aspect of the invention, the ItemID of the game asset, may be associated with a corresponding NFT that represents "ownership" of that game asset. The NFT may have a TokenID. This association may be stored in the vault (e.g., in the vault smart contract) as discussed below. When a user uses the game asset within the game, the centralized game inventory management system manages the transactions using the ItemID and reflects user ownership within the player's account. When the user wants to engage in transactions outside of the game, the technology platform of the invention (e.g., the facilitator) informs the game inventory management system to prevent further use of the asset within the game (e.g., lock the game asset), identifies the TokenID of the token corresponding to the ItemID, and issues that token to a player-designated crypto wallet. If the player has a crypto wallet, they can designate their own wallet. Players can also designate another crypto wallet. Once the token is in the wallet, it can be transacted on the Ethereum network (or other decentralized network depending on the protocol associated with the token).

Game assets may include, for example, an in-game virtual currency, functional gameplay items (weapons), non-functional game items (e.g., skins), land and/or other game assets as is generally known and used in existing traditional (non-blockchain games). The purchase, sale, trading and use of game assets are typically managed by an in-game management system. Each instance of a game asset may have an ItemID. Each player may have a unique UserID and an electronically maintained game account via the game management system. The inventory of game assets possessed by a player may be reflected as a list of ItemIDs in the player's account. The account management for these assets is typically a centralized database management system controlled by or on behalf of the game operator and is managed in a traditional database. As indicated below, the tokens may have a unique identifier, for example, TokenID.

The technical solution that enables this operation is described below. Other aspects of the invention will be clear from the remainder of the description.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

DETAILED DESCRIPTION

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

One aspect of the invention addresses the dichotomy between traditional, closed-loop game economies and open-loop, blockchain token-based economies. Most traditional games are based on closed-loop economies, where the in-game currency and/or other game assets are created and managed (typically by or on behalf of the game operator) via a centralized database under control of the operator. The game assets are not owned by the player (they are only licensed to the player) and they can only be used in the game and typically cannot permissibly be traded, sold or exchanged outside of the game. In traditional games, the terms of service make clear that players only obtain a revocable license to the game assets they "purchase" inside the game. For example, when a player purchases a gun, a skin, or other game assets inside a game, they are really purchasing a license to use the game assets within the game. If the player's account is terminated, the license terminates as well and the player receives nothing of value in exchange. However, there are typically no fees to the player associated with the creation of or transactions involving those game assets.

In contrast, most blockchain game economies are open-loop economies, where the cryptocurrencies and NFTs used are owned outright by the players and are designed to be traded or sold on digital asset exchanges. The terms of service typically do not prohibit the sale of the digital assets (although they may in some cases) and the game operator often facilitates the ability for players to trade or sell the digital assets on digital asset marketplaces. If the player's account is terminated, the player can keep their digital assets and/or trade or sell them. However, there are typically fees charged to players for the creation of and/or transactions involving the tokens.

Token transactions have associated costs to the player that may deter transacting, especially where transactions occur frequently and/or are of lower value. By way of example, each Ethereum-based transaction, or set of transactions, has an associated cost (a gas fee) when tokens are transacted on the Ethereum network. This fee results in part from the decentralized nature of the network and the need to incentivize nodes (or node operators) to validate the transactions according to the DLT protocol.

One aspect of the invention relates to a technological solution that enables a hybrid approach that permits certain transaction of game assets to be conducted and managed by the operator using a centralized database management approach (with necessarily incurring a per-transaction fee to the user) and other transactions to be managed on a decentralized network, via a blockchain or other DLT network, which may subject the user to a per-transaction network transaction fee. In some cases, the transactions most suitable to be managed via the centralized database are transactions that occur within the game and the transactions most suitable to be managed via the decentralized database are transactions that occur outside the game, for example on a decentralized exchange.

By way of example, when a player desires to purchase a token representing a game asset that may be used in a game, the actual minting and issuance of the token may be delayed to reduce network transaction costs. Instead, the player's in-game account (e.g., as managed by the operator) may be updated to reflect the player's access to use the game asset. This avoids the need to pay gas or other decentralized transaction fees at that time. As long as the game asset remains in the player's account, they may use it or engage in in-game transactions (e.g., use for gameplay, transact in-game with another player, transact in-game with the operator or other in-game transactions) managed by the game operator via the centralized game management database system.

If the player wants to engage in a transaction with the token (e.g., which represents the game asset) outside the game (e.g., sell it on a decentralized exchange or other transaction external to the game), the token can be created (minted) if it has not already been created and transferred to a crypto wallet associated with the player (if they have one) or other wallet designated by the player. The token can then be transacted in any way permissible in accordance with the decentralized network protocol associated with the token.

In this way, there is not necessarily a decentralized transaction fee associated with each exchange within the game (e.g., transactions managed by the centralized game database), even if there is a decentralized transaction fee when the user deposits tokens into the game, extracts tokens from the game, or otherwise engages in transactions that are implemented via the decentralized network.

The transactions may be divided into transactions managed by the centralized database system (in the game environment), transactions managed by the decentralized blockchain (or other DLT) network and those managed by the vault smart contracts.

In order to realize the benefits of this hybrid approach to transaction management, the invention contemplates using a set of technologies. These technologies are described below. In summary, however, these technologies provide an interface between the centralized game environment and a blockchain network. The interface component includes a facilitator and a vault smart contract. This enables players to deposit tokens they already have in a wallet into the vault and the underlying game asset to be reflected into the players' in-game inventory.

The blockchain network may be a decentralized network. For example, the blockchain network may be an Ethereum-based network. The game environment may be an online environment that has an in-game management system, which includes a game inventory management feature, that uses an in-game ItemID for game assets. At least some of the game assets may be tokenized, such that a token represents ownership of the game asset. The exemplary operations include communications between a blockchain network and the facilitator, and between a game environment and the facilitator.

When a player desires to acquire a new tokenized blockchain game asset, typically this would result in the token being delivered to the player's crypto wallet, the token transaction would incur a network transaction fee and the user would typically need to have previously created a crypto wallet.

Instead, using the technology of the invention, when a player desires to acquire a new blockchain game asset, the token (if it already exists) is stored in the vault smart contract and the facilitator communicates with the centralized game database to cause the game asset to be recorded in the player's game inventory account, without the token being transferred to the player's wallet. If and when the player decides to withdraw the game asset from the game, the facilitator sends a message to the centralized game database to determine if the player's game account actually reflects that the player remains in possession of the game asset prior to the transaction. If not, the transaction is denied. If so, the centralized game database locks or otherwise prevents the player from transacting the game asset; and, once this has been done, confirms this with the facilitator. The facilitator communicates with a vault smart contract (detailed below) and the smart contract can mint the token (if it has not already been minted) and transfer the token (whether newly minted or previously existing) to the designated wallet. If that transaction completes successfully, then the facilitator messages the centralized game database and the centralized game database updates the player's account by changing the status of the corresponding game asset from locked to transferred or other similar action to reflect that the player no longer possesses the game asset. As a result the item is removed from the in-game inventory of the player's account.

Figure 1:
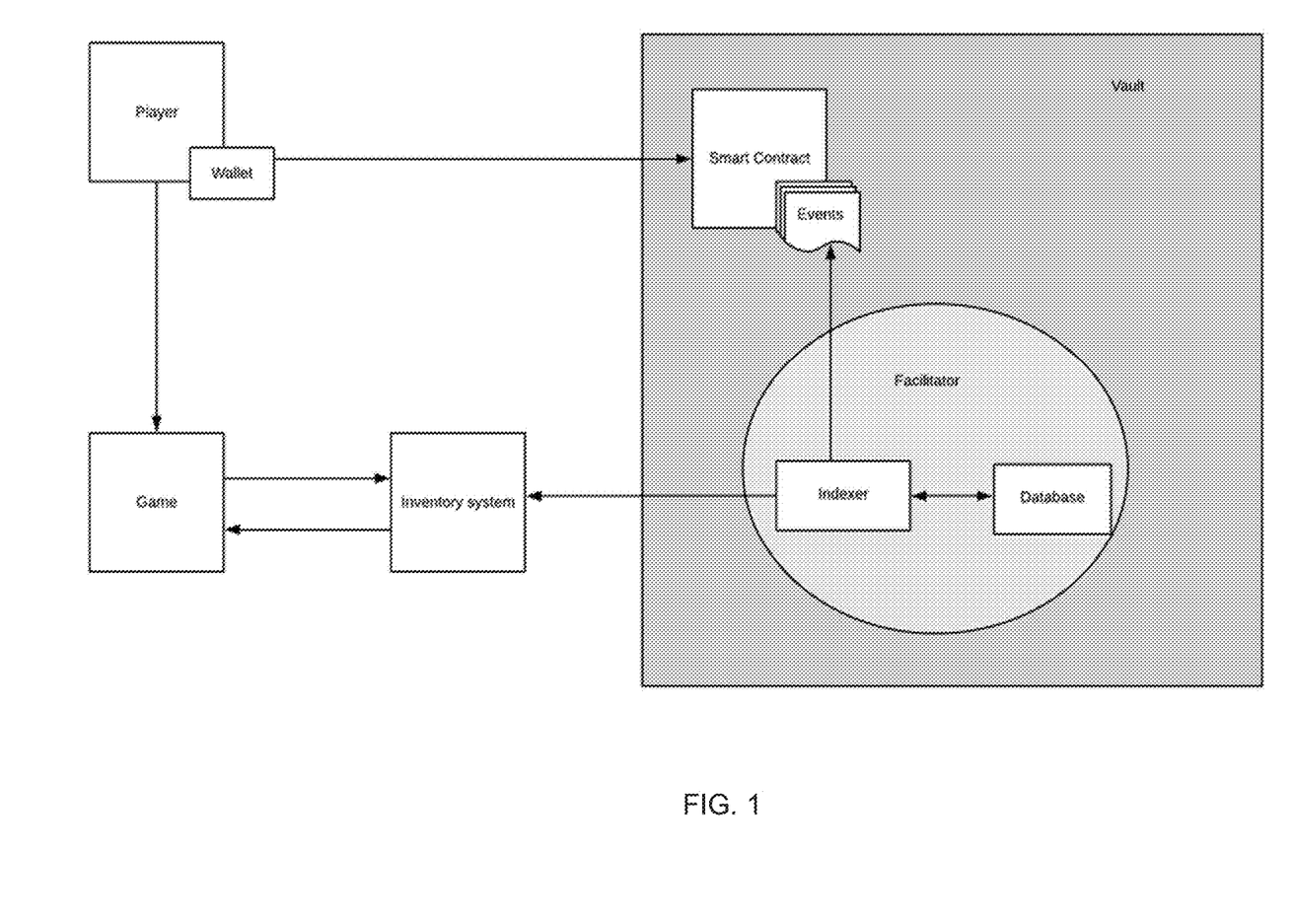
FIG. 1 is a high level block diagram that illustrates the overall architecture for one aspect of the invention.

FIG. 1, below, is a high level block diagram that illustrates the overall architecture for one aspect of the invention that can be used for storing, issuing, and transacting tokenized blockchain game assets managed by a smart contract. The overall system may include a vault smart contract module, a facilitator (including an indexer and a database), one or more game environments that have established communication with the facilitator, and a game inventory management system. In some embodiments, one or more user wallets may be attributable to one or more of the players.

One or more graphical user interfaces (not shown in FIG. 1) may be used by the player to specify transactions. The graphical user interfaces enable a player to create and manage a vault account, associate one or more wallets with the vault account and to acquire, deposit and withdraw tokens. By way of example, once the user has created a vault account and associated a wallet (if they have one), the user can select an icon of the wallet, select one or more tokens to be deposited into a selected game, and select to cause the deposit transaction to be implemented as described herein. Players may also acquire tokens via the interface, whether they have a wallet or not, as described herein. The player can also use the graphical user interface to withdraw game assets from a game by selecting the game assets and designating an icon of the wallet to which the tokens should be transferred. One advantage of this is that the user can select an icon of the wallet to specify the wallet to be used in a transaction, rather than a complicated wallet address.

The facilitator may allow for the game assets to be moved into and out of the game environment in a more efficient manner as described herein. The facilitator may include an indexer and a database. The indexer may interact with the vault smart contract to detect events. The events may relate to the deposit, acquisition and/or withdrawal of tokens and/or other events. The database may store event data and other information.

The vault smart contracts may "lock" tokens attributable to a player while the game asset is in the player's game inventory. Once a tokenized game asset is moved into the game environment, the game inventory management system may permit transactions to occur (via a centralized database) without the need to transfer the corresponding token as part of that transaction.

As further detailed herein, if a player desires to acquire a new game asset, the facilitator may facilitate the acquisition. As explained herein, aspects of the invention may also enable a user to acquire a tokenized game asset even if they do not have a wallet. Via communications with the in-game management system, the facilitator may enable movement of the game asset into the game environment to be included in the player's in-game inventory, without the token needing to be minted at that time. Rather, the minting of the token can be deferred until when and if the player desires to withdraw the game asset from the game environment.

As further detailed herein, if a user already has an existing token, representing a tokenized game asset, the facilitator may facilitate deposit of the game asset into the game environment to be included in the player's game account inventory while the token remains locked in a vault smart contract.

The indexer may be used to detect events that occur with respect to the smart contracts as further explained below. Event data and other data may be stored in the facilitator database.

Figure 2:
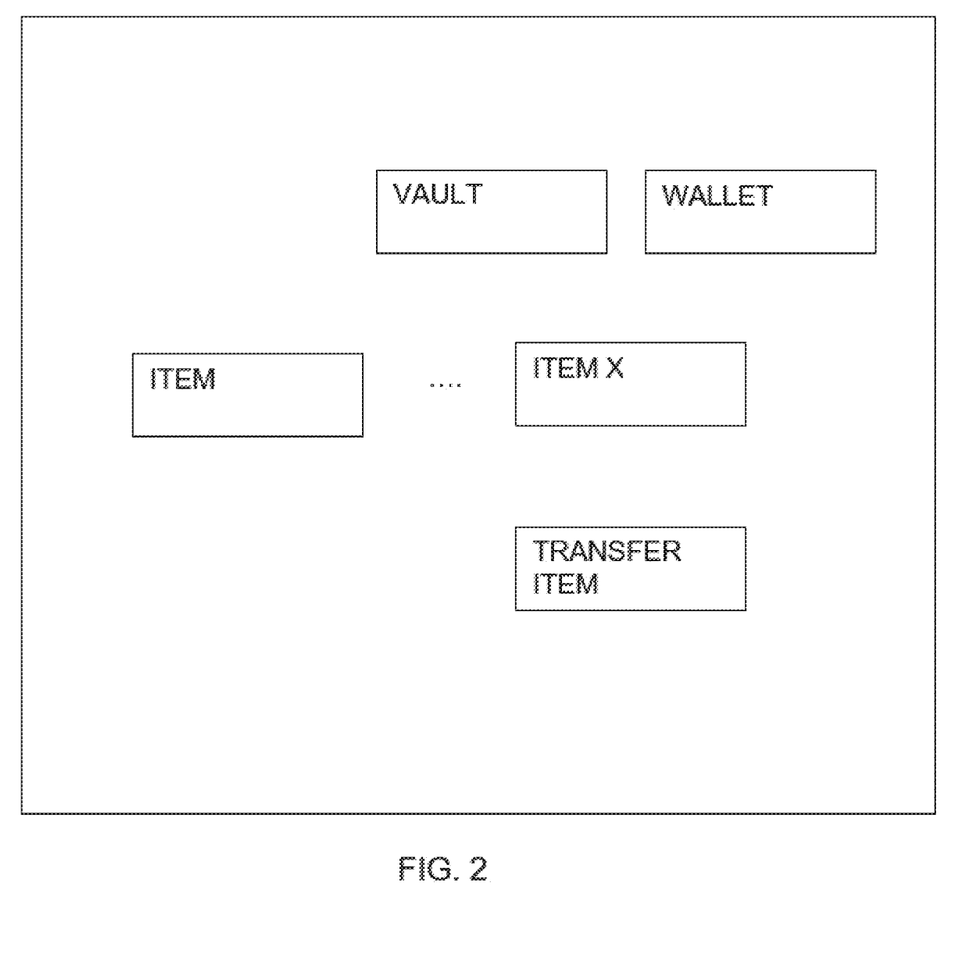
FIG. 2 displays examples of UI elements.

FIG. 2 depicts a high level representation of certain aspects of the graphical user interface elements of the vault application. For simplicity one UI is shown, but multiple UIs may be used to accomplish the functionality described herein.

The player may create a vault account and interact with their vault via a computer implemented software application that includes a graphical user interface. The graphical user interface(s) may include at least one UI that represents digital assets available from one or digital asset marketplaces that are accessible via the vault interface. One or more of the interface(s) may include at least one UI that enables a player to create and/or transact with a player vault account. One or more of the interface(s) may include at least one UI that enables a player to create and/or transact with a wallet. If the player has one or more wallets, the player may associate the wallet(s) with the vault account. This enables a player to more easily move tokens from a wallet to their vault and from their vault to a wallet via the vault interface. If the player does not have a wallet, the player may still use the vault to acquire tokenized game assets as discussed below. From the interface the player may select one or multiple digital assets to acquire and the vault interface can facilitate the acquisition for the player and deposit the token corresponding to the digital asset into the player's vault. Once a digital asset is in the player's vault they can move it into a game, transfer it to their wallet (if they have one) or another wallet via the vault interface. Additionally, via the vault interface, the player can transfer digital assets from the player's wallet to a game, their vault or other wallet. Once a player has created a vault account and associated a wallet, the vault application interface makes it much easier for the player to acquire digital assets and move the digital assets between their vault and wallet and into and out of a game. When selecting the vault display element, the vault application may display the assets in the player's vault. Once displayed, the player can select one or more of their assets to transact. When selecting the wallet display element, the vault application may display the assets in the player's wallet. Once displayed, the player can select one or more of their wallet assets to transact.

The vault application can connect on the backend to digital marketplaces, wallets and game inventory management systems. Set up of these connections can be established in advance to enable the use of these vault features.

By way of example, the UI(s) may have a display element to select and interact with a player's vault, a display element to select and interact with a player's wallet, a display element to select and interact with a transfer item control and a display element to select and interact with a marketplace of digital assets.

Figure 3:
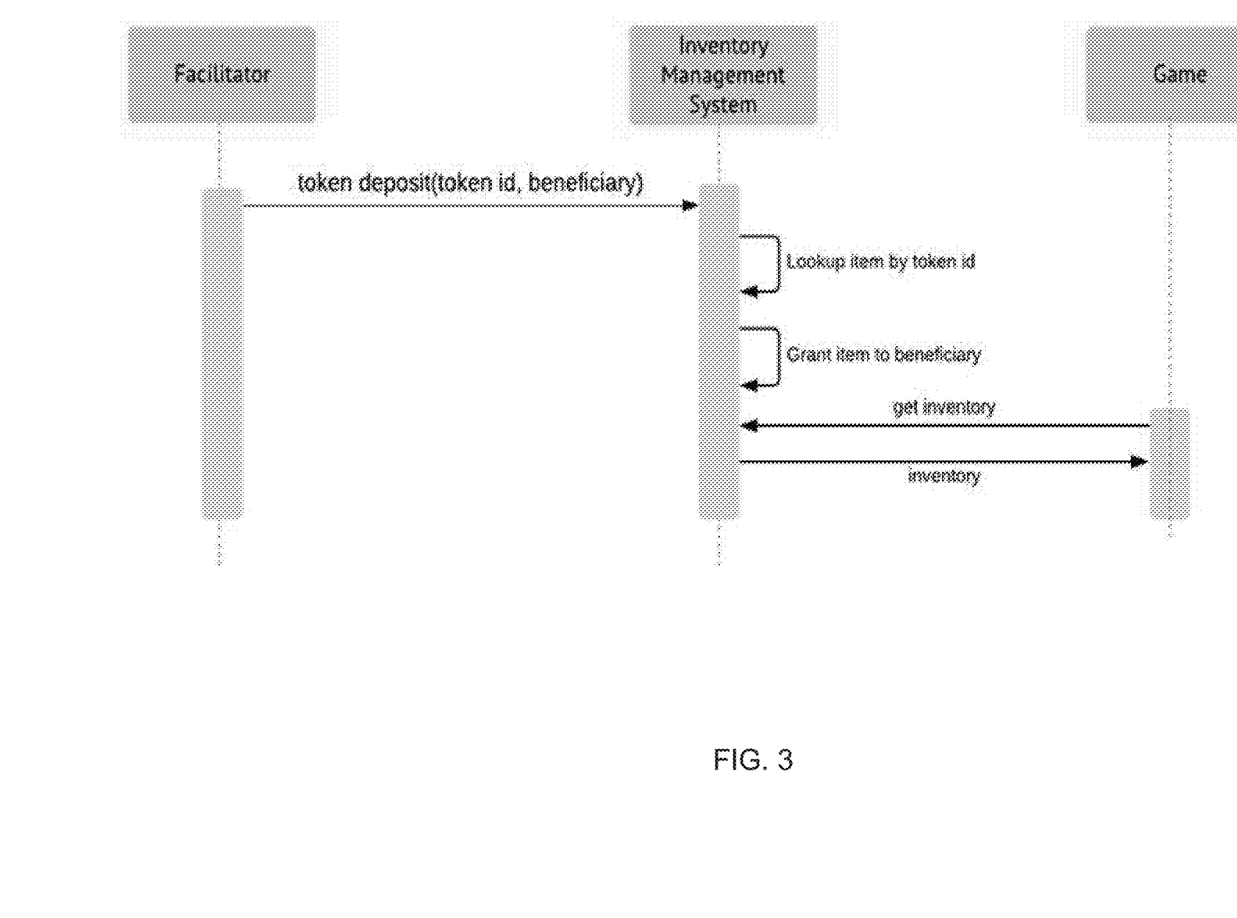
FIGS. 3-5 depict examples of processes by which a user may import and export tokenized game assets to and from their game account inventory according to a variety of use cases.
Figure 4:
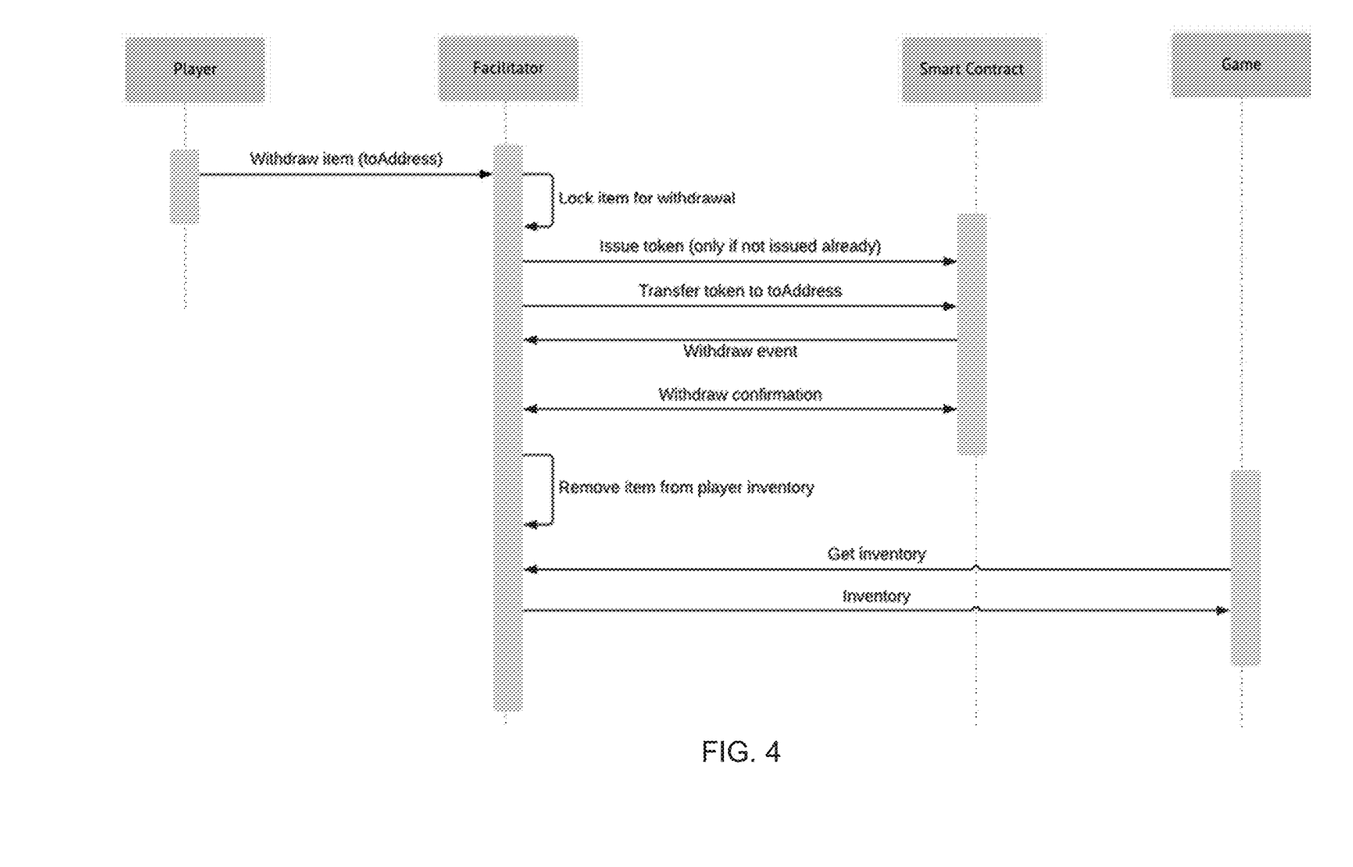
Figure 5:
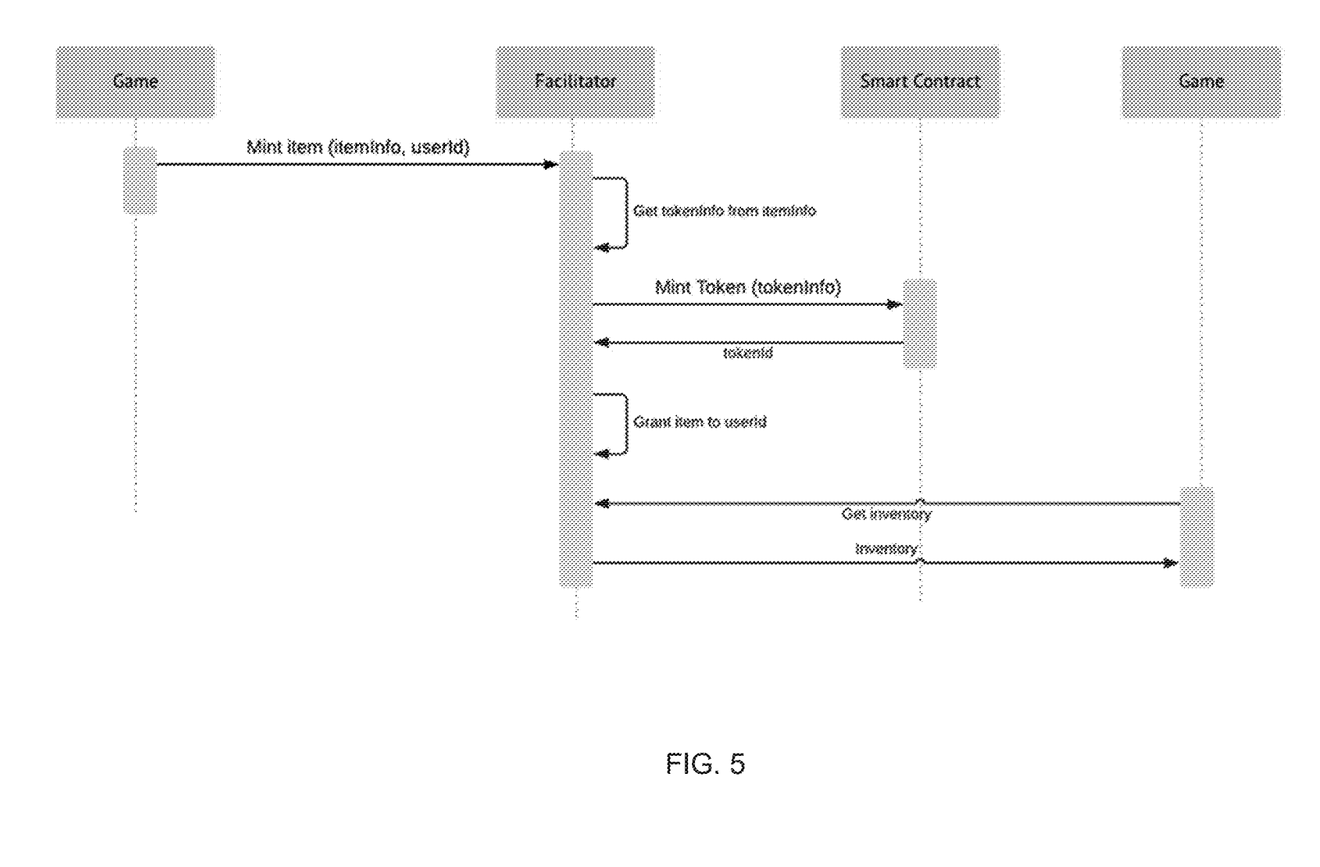

FIGS. 3-5 depict examples of processes by which a user may import and export tokenized game assets to and from their game account inventory according to a variety of use cases.

Scenario 1—Deposit Existing Token

In one scenario, a user already has a tokenized game asset (associated with their wallet) and desires to import the game asset into the game environment to be included in the player's game account inventory.

1. When a user desires to deposit a token, the vault sends a TokenDeposit message to the facilitator along with a TokenID and a beneficiary. The beneficiary is the player or player account to which the game asset is to be associated. [correct?] The vault effectively locks the token in the vault smart contract. The vault becomes the custodian for the tokens. The token and vault may be compatible with a decentralized environment, such as the Ethereum network.
2. The facilitator pulls events from the Ethereum network/vault contracts regarding the importing and exporting of tokens. For example, it recognizes that the token has been deposited to the vault.
3. Once the token is locked inside the vault, the facilitator communicates with the in-game management system to add the game asset, corresponding to the deposited token, to the beneficiary's game account inventory.
4. The players can perform operations in the game with respect to the game assets without the need to transact the token for such operations. With the item in the player's inventory, they can use the item within the game environment, while the token corresponding to the item remains locked in the vault smart contract.

Scenario 2—Withdraw Game Asset from Game

In another scenario, the user may decide to withdraw a game asset from the game, and have the corresponding token sent to a designated wallet.

1. When the user elects to withdraw a game asset from the game (e.g., by selecting an option to withdraw the game asset from the game and designating a wallet), the vault sends a Withdraw message to the facilitator along with the TokenID and a ToAddress for the designated wallet.
2. The facilitator communicates with the game management system to confirm whether the game asset is in the player's inventory. If so, the game management system locks the game asset to prevent further in-game transactions with that game asset.
3. If the facilitator receives confirmation that the user has the game asset in its inventory, then the facilitator messages the vault contract.
4. The vault contract unlocks the token (if it already exists) and transfers the token to the designated wallet. If the token does not exist, the token is minted and then transferred to the designated wallet.
5. The asset is then removed from the player's in-game inventory.

Scenario 3—Mint Scenario

In another scenario, in response to a request, the facilitator may communicate with the vault to mint a new token corresponding to a game asset. When requested, the game may generate and send to the facilitator a Mint request message for the facilitator to mint an item. The facilitator may generate a Mint message and send it to the vault with the token info. The token info needed will vary based on the token, but may include a contract address and an ID. The vault smart contract mints the token and provides a TokenID which is communicated to the facilitator. The facilitator creates and sends a message to cause the game asset to be associated with the player's in-game inventory associated with the UserID. The database stores the ItemID with the TokenID. This makes the game asset available to the identified user via their inventory so that the user may access, use and transact the item within the game while the token is locked in the smart contract. If the token is being minted in response to a withdraw request for a token that has not yet been minted, when the smart contract mints the token, the token can be sent to the designated wallet.

The vault may operate as a custodian exchange holding NFTs (e.g., ERC20 Tokens) for the players to remove blockchain friction, thereby allowing the players to own scarce blockchain game assets, use them within the game, and perform instant trades. The facilitator may provide mechanisms so players can transfer those assets in and out of the game environment. The vault may support NFTs that follow the ERC721 standard, ERC1155 standard, and/or other NFT standards.

A facilitator may be compatible with one or more in-game management systems. The facilitator may act on vault events, and also be in charge of defining an interface to access the vault. The facilitator may allow the vault to be agnostic with regard to which in-game management system is being used, or with regard to how the inventory system works internally.

Example Use Cases

Smart Contract(s)

SCUC1: As a vault smart contract, I can receive NFTs from EOA (externally owned account) and CA (contract account).
1. Players send a transaction from their account to the vault address.
2. The vault contract emits an event to map the NFTs to the user.

SCUC2: As a vault smart contract, I can send NFTs to EOA and CA.
1. A transaction is sent to the vault contract to transfer NFTs to a specific address.

2. The vault contract emits an event to remove the mapping of the NFTs to the user.

Indexer Use Case(s)

IUC1: As an indexer, I can index NFT transfers to and from the vault address to define their ownership.
1. A Transfer event is being listened to.
2. The indexer stores the event in the database by normalizing the data related to a transfer in or out.

IUC2: As an indexer, I should notify the vault of new events.

Vault

The vault application (VA) runs on a hardware processor (not shown) and interfaces with game or other software that wants to interact with the vault. In order to support multiple NFT contracts and collections, a contract interface must be implemented to be compliant with the vault pre-mint system as part of a setup operation. This interface (Smart contract) works as an NFT factory. Various implementations may be used. The following are examples only and the invention is not limited to these implementations.

VAUC1: As a VA, I can provide an endpoint to pre-mint an NFT.
1. A UI wants to mint an NFT to a user.
2. The UI sends a @POST request to the VA with the contract address, userId, and the option id.
3. The user receives an email saying that an NFT has been minted and can be used.

VAUC2: As a VA, I can provide an endpoint to transfer out NFTs from the vault.
1. A UI sends a @POST request to the VA with the NFT contract addresses, NFT Ids or mint ids, the recipient address, the userId, and a signed message.
2. The VA sends an email to the user's email account to confirm the transfer out.
3. The user opens the email and clicks on the confirm button.
4. The VA receives the confirmation and sends the NFTs to the recipient address.

VAUC3: As a VA, I can provide an endpoint to return the NFTs owned by a user.
1. A UI sends a @GET request to the VA to get the NFTs owned by a user.
2. The VA returns the NFTs owned by the requested user.

NFT Factory (NF)

An NFT Factory is a contract that interacts with the real NFT contract to mint new assets if those assets can be pre-minted. In case the real NFT contract doesn't support the required function.

NFUC1: As a NF, I should implement the function defined by the NF interface.

NFUC2: As a NF, I should be the only address allowed for an ERC721 contract to mint NFTs.

NFUC3: As a NF, I should accept only calls to mint NFTs from the DVA address.

The description of the functionality provided by the different instructions described herein is for illustrative purposes, and is not intended to be limiting, as any of the instructions may provide more or less functionality than is described. For example, one or more of the instructions may be eliminated, and some or all of its functionality may be provided by other instructions.

Aspects of the disclosure may be implemented as instructions stored on a machine-readable medium, which may be read and executed by one or more computer processors. A machine-readable medium may include any mechanism for storing or transmitting information in a form readable by a machine (e.g., a computing device). For example, a tangible computer readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

For purposes of explanation, numerous specific details are set forth in order to provide a thorough understanding of the description. It will be apparent, however, to one skilled in the art that implementations of the disclosure can be practiced without some of these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is an express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A computerized system for providing a vault application for interfacing between: i) a centralized game environment, which has established communication with the vault application, the centralized game environment having a game inventory management system with a user in-game inventory and ii) a decentralized network, the system comprising:

a memory for storing computer executable modules; and
at least one processor configured to execute the computer executable modules; the computer executable modules comprising:
the vault application being configured to facilitate the movement of tokens to/from the vault application and to/from one or more crypto wallets configured to transact with one or more decentralized networks, the vault application being configured to:
store a token corresponding to a game asset on behalf of a user;
communicate with the game environment to indicate the user's right to the game asset;
receive a user selection of a request for a game asset to be removed from the user's in-game inventory and designation of a wallet address;
communicate, to the game environment, a message regarding the request for removal of the selected game asset;
receive, from the game environment, confirmation of request for removal of the selected game asset from the user's in-game inventory; and
generate a transaction to cause the token corresponding to the selected game asset to be transferred, via a vault smart contract, to the designated wallet address.

2. The system of claim 1, wherein the game asset includes a tokenized game asset which is transactable on a decentralized network and represents ownership of the game asset, the vault smart contract is configured to lock tokens attributable to a user while game assets are in the user's in-game inventory; and
for game assets moved into the game inventory management system via communication with the vault application, the game inventory management system is configured to permit transactions of the game assets to occur within the game without the need to transfer the corresponding token as part of that transaction.

3. The system of claim 1, wherein the vault includes a facilitator and one or more vault smart contracts and the facilitator comprises an indexer and a facilitator database;
wherein the indexer is configured to interact with the vault smart contract to detect events relating to the deposit, acquisition and/or withdrawal of tokens; and the facilitator database is configured to store event data.

4. The system of claim 1, comprising a vault user interface configured to enable a user to create and manage a vault account, associate one or more wallets with the vault account and to acquire, deposit and withdraw tokens to/from the account.

5. The system of claim 1, wherein the vault application is further configured to facilitate the user's acquisition of a new, tokenized game asset, the vault being configured to:
receive selection of a tokenized asset to be acquired;
obtain and store a token ID associated with the tokenized asset;
communicate with the game management system to authorize the game asset to be useable within the game without generating the token corresponding to the token ID;
receive a user request to transact the tokenized game asset outside of the game to a designated wallet;
generate the token; and
generate a transaction to transfer the token to the designated wallet.

6. The system of claim 1, comprising a vault user interface configured to:
display an option for a user to select an icon of one of the user's wallets,
display tokens associated with the selected wallet;
receive selection of a token corresponding to a game asset to be deposited into a selected game; and
communicate with the game environment to indicate the user's rights to the game asset.

7. The system of claim 1, comprising a vault user interface configured to:
display game assets associated with the user;
receive selection of a game asset to be withdrawn from a game;
display an option for a user to select an icon of one of the user's wallets;
communicate to the game inventory management system a message to prevent further use of the asset within the game;
receive confirmation from the game environment; and
generate a transaction via a smart contract to transfer the token corresponding to the selected game asset to a selected wallet.

8. The system of claim 1, wherein the vault user interface comprises:
a display element configured to display an option for a user to create a vault account and interact with their vault account;
a display element configured to display an option for a user to select and interact with one or more user wallets;
a display element configured to display an option for a user to select and interact with a transfer item control; and
a display element configured to display an option for a user to select and interact with a marketplace of digital assets.

9. The system of claim 8, wherein the vault user interface includes a display element configured to display, for a user selected wallet, the user's assets in the selected wallet;
a display element configured to display an option for a user to select one or more displayed assets to transact.

10. The system of claim 1, wherein the game asset has an ItemID designated by the in-game management system and the vault smart contract is configured to store an association of the ItemID of the game asset and a TokenID of a token corresponding to the game asset.

11. The system of claim 1, wherein the game inventory management system is configured to manage in-game transactions relating to a game asset based on its ItemID and the vault application is configured to manage transactions relating to the token associated with the game asset.

12. The system of claim 1, wherein the vault application is further configured to process a deposit request for a tokenized game asset, the vault application being configured to:
send a Token Deposit message to the facilitator, including a TokenID and a beneficiary to which the game asset is to be associated;
lock the token in the vault smart contract; and
the facilitator is configured to communicate with the game inventory management system to add the game asset, corresponding to the deposited token, to the beneficiary's game account inventory, to enable use of the game asset within the game environment, while the token corresponding to the item remains locked in the vault smart contract.

13. The system of claim 1, wherein the vault application is further configured to process a withdrawal request for a tokenized game asset, wherein:
the vault application is configured to:
receive selection of a game asset to be withdrawn from the game and send a Withdraw message to a facilitator along with the TokenID and a ToAddress for a designated wallet;

the facilitator is configured to:
receive confirmation from game inventory management system that the user has the game asset in the user's in-game inventory and message the vault contract; and the vault contract is configured to:
unlock the token and generate a transaction to transfer the token to the designated wallet.

14. The system of claim 1, wherein the facilitator is configured to process a mint transaction, wherein:
the facilitator is configured to:
receive a Mint request message for a tokenized game asset and generate a Mint message and send it to the vault with token information;
the vault smart contract is configured to:
mint the token and provide a TokenID to the facilitator;
the facilitator is configured to send a message to associate the game asset with the user's in-game inventory; and
the database is configured to store an ItemID of the game asset with the TokenID.

* * * * *